Nov. 1, 1938.  F. G. HOBART  2,134,758
GOVERNOR MECHANISM
Filed Oct. 16, 1936    3 Sheets-Sheet 1
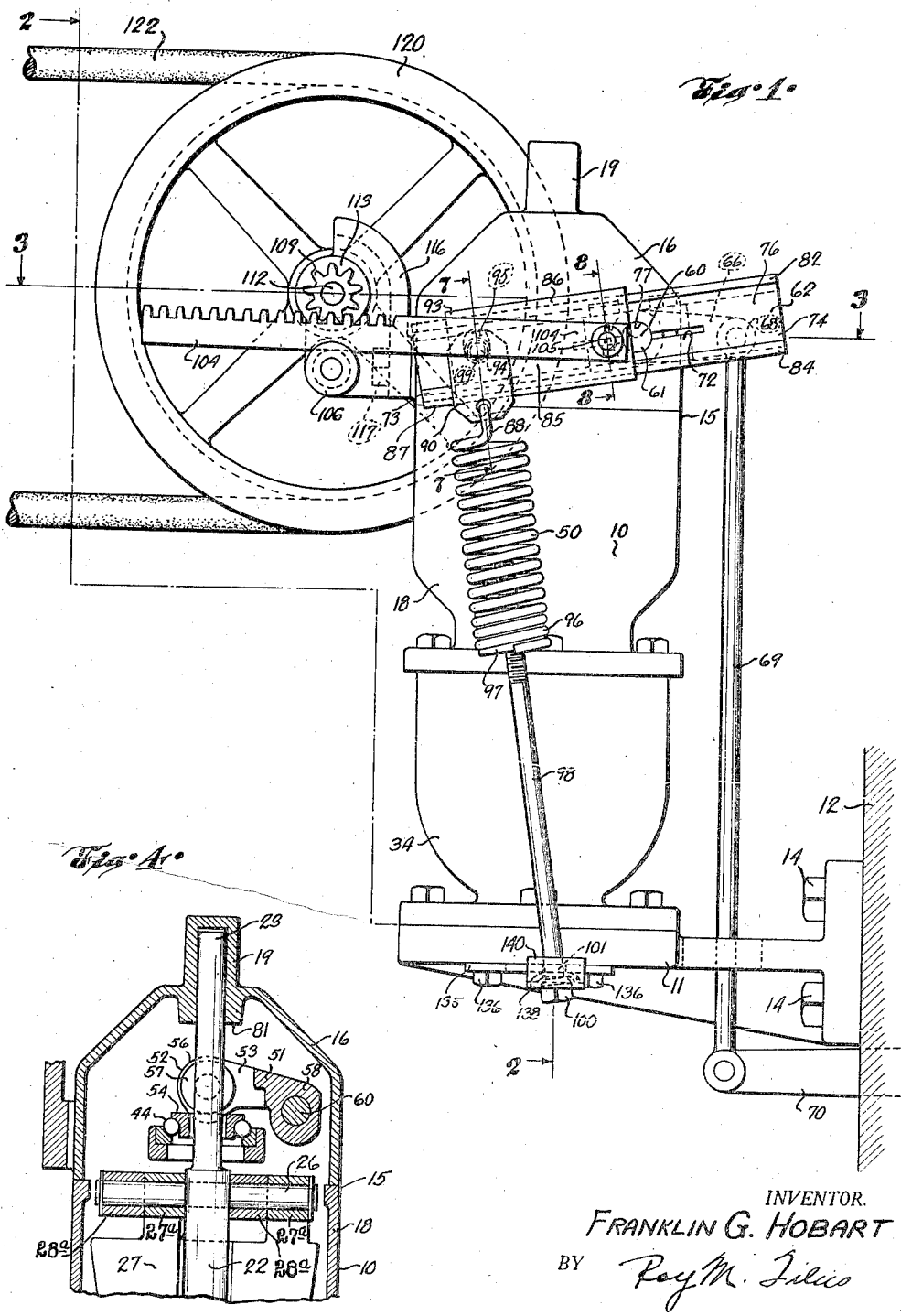
INVENTOR.
FRANKLIN G. HOBART
BY Roy M. Tilles
ATTORNEY

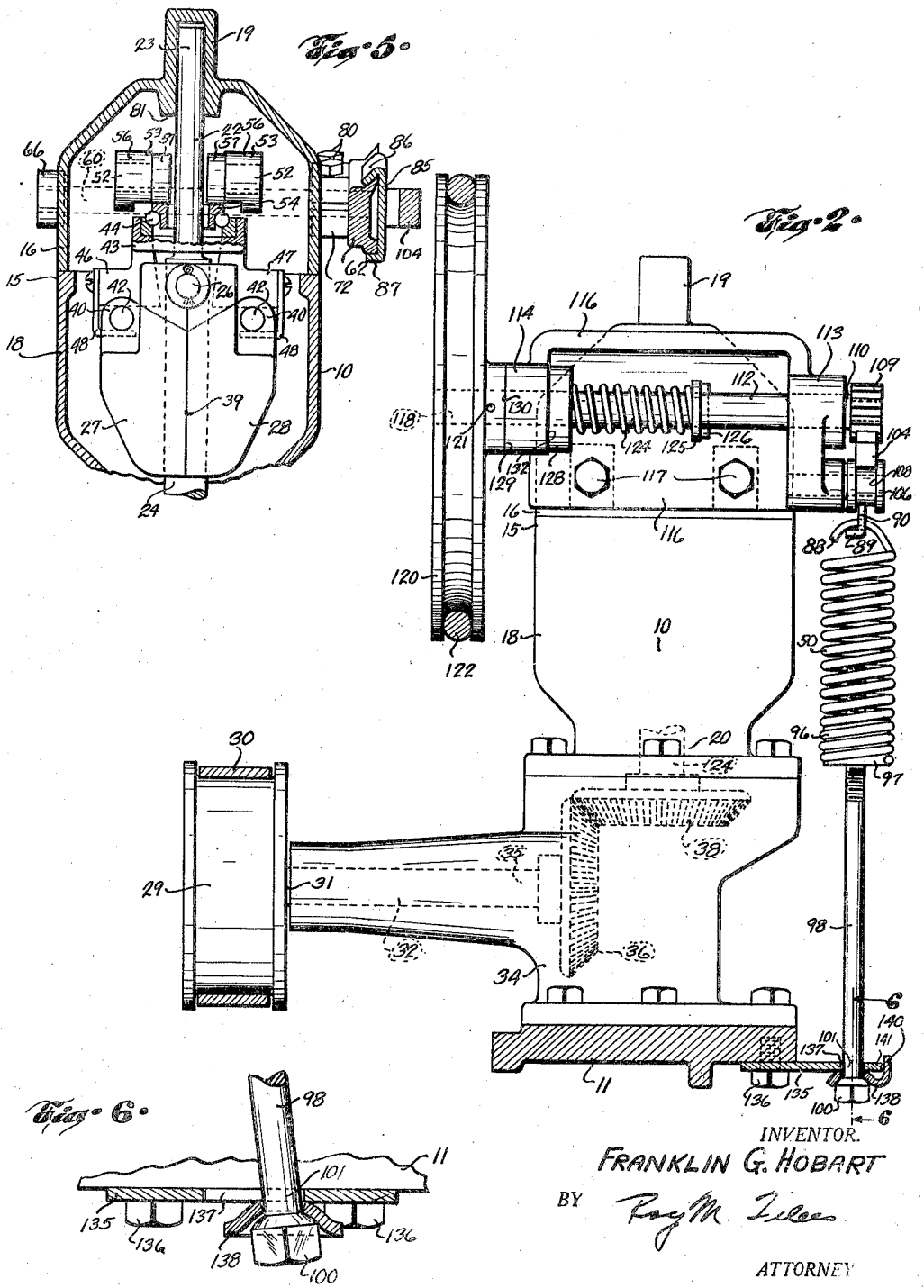

Nov. 1, 1938.   F. G. HOBART   2,134,758
GOVERNOR MECHANISM
Filed Oct. 16, 1936    3 Sheets-Sheet 3
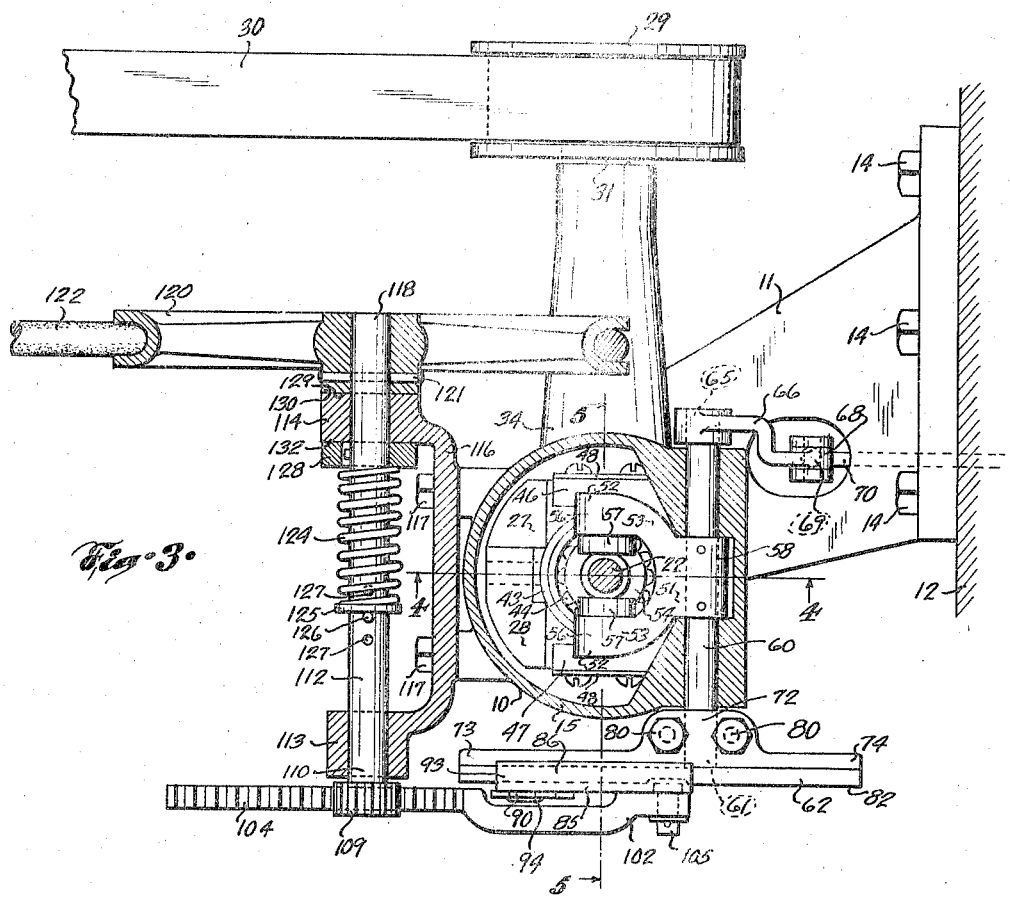
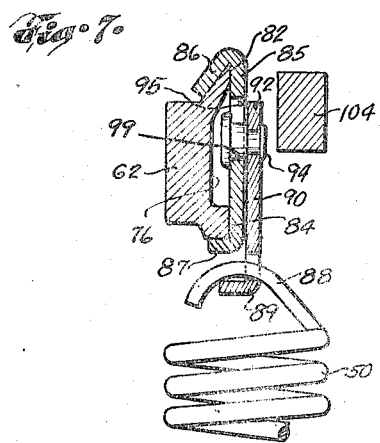
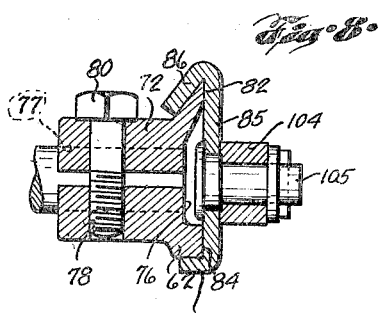
INVENTOR.
FRANKLIN G. HOBART
BY
ATTORNEY Patented Nov. 1, 1938

2,134,758

UNITED STATES PATENT OFFICE 2,134,758

GOVERNOR MECHANISM

Franklin G. Hobart, Beloit, Wis., assignor to Fairbanks, Morse & Co., Chicago, Ill., a corporation of Illinois Application October 16, 1936, Serial No. 105,901

2 Claims. (Cl. 264—3)

This invention relates to governor mechanisms for use with internal combustion engines and the like, and more particularly to improvements in a control mechanism therefor, wherein the applied force opposing the action of the governor weights as affected by the engine speed, may be varied at will, between zero and a maximum value.

In a governor of the fly ball type, comprised generally, of weights operatively associated with a sleeve which is longitudinally slidably seated about a spindle and rotated thereby, the rotative speed of the spindle varies directly with the speed of the engine with which it is operatively associated, so that the weights, under the action of centrifugal force, will be displaced outwardly of the sleeve and spindle a distance which is directly proportional to the engine speed. The outward movement of the weights under the action of centrifugal force, effects an axially sliding movement of the sleeve on the spindle, the axial displacement of the sleeve being utilized to actuate an engine control mechanism of any suitable type, in operative association with the engine. It is thus readily apparent that if the motion of the sleeve, as effected by the centrifugal displacement of the weights, is opposed by a variable, applied force counteracting such sleeve motion, the centrifugal force required to displace the weights and hence to move the sleeve a defined distance, will be at a minimum when no such force is applied, and must increase proportionately to the application of the counteracting force. Hence, by regulating the effective counterforce, the action of the governor in controlling engine speed, may be regulated to any desired degree.

Governor control mechanisms of the type usually employed for regulating the action of fly ball type governors, include a spring or other resilient member arranged to provide a yieldable and variable force in opposition to the centrifugal effect of the governor weights. The effect of the spring has been heretofore regulated by varying the tension of the spring, or by varying the length of a lever arm to which the spring may be connected, the lever arm in the latter instance, generally being operatively connected in a positive manner to the governor actuated control sleeve. In the present invention, as exemplified by the governor control mechanism hereinafter to be fully described, the above noted means for varying the spring force applied in opposition to the centrifugal force of the governor weights, are combined in an improved manner so as to provide a positive engine control over a wide range of engine speeds.

The novel governor control mechanism of the present invention is particularly well adapted to the speed control of Diesel engines utilized in connection with well drilling rigs and the like, where the demand for a wide range of engine speeds and flexibility of engine speed control is paramount. However, the present control mechanism is not closely restricted as to usage. An engine operating a well drilling rig is subjected to frequent speed changes, varying from an idle speed under a no load condition, to full speed under a maximum load condition. Under these conditions then, it is most desirable to provide a simple and effective governor mechanism including regulating means capable of a maximum control of the governor, whereby an engine speed required for a particular operating condition may be quickly attained and positively maintained within an extremely narrow range. Accordingly it is an object of the present invention to provide a governor of the type noted with a novel control mechanism therefor, wherein the control mechanism operates to regulate springs or other means opposing the centrifugal force acting on the governor weights, and further, wherein the control serves to vary the force of the opposing means from zero to the maximum force which the opposing means is capable of producing.

Another object is found in the provision of an adjustable supporting mechanism for the spring opposing the centrifugal action on the governor weights, the mechanism providing a moment arm for the spring, acting about a shaft arranged in direct bearing relation with the governor weights, the moment arm being variable at will, from zero to a desired maximum length. Moreover, the arrangement of the supporting mechanism is such that the force exerted by the spring, and the length of the spring moment arm may be varied independently of each other.

Another object is attained in connection with a governor of flyball type acting on an engine control shaft, in the provision of means for varying the moment arm through which the control spring acts on the shaft, from zero to a desired maximum length on opposite sides of the shaft, the arrangement being such that when the moment arm is produced on one side of the shaft, the spring will act to oppose the action of the fly weights on the shaft, while producing the moment arm on the opposite side of the shaft serves to position the spring so that it will aid the fly weights, and will effect a positive actuation of the engine control shaft to stop the engine.

A further object is attained in the provision of a compact governor control mechanism comprised of but few parts, arranged so as to be capable of a ready adaptability of application to various types of engines. The control mechanism is sturdy and positive in its operation, and requires little or no attention under conditions of rough handling and continued hours of use.

A still further object is attained in the provision of an improved control mechanism for a governor of flyball type, the effect of the control on the governor being such that the percentage of variation of engine speed from no load to any given full load corresponding to a given engine speed, is substantially the same for each speed setting of the control mechanism, between its minimum and maximum speed control positions.

Further objects and advantages of the present invention will become apparent in the following detailed description of parts and operation taken in connection with the accompanying drawings, in which:

Fig. 1 is an assembly elevation of a governor organization, preferably of fly ball type, incorporating the improved control mechanism of the present invention; Fig. 2 is a side elevation, partly in section, of the governor and control mechanism, as taken along line 2—2 of Fig. 1 and showing certain of the drive elements in dotted lines; Fig. 3 is a sectional plan view of the mechanism, as taken on line 3—3 of Fig. 1; Fig. 4 is a fragmentary, transverse section of the governor as taken along line 4—4 of Fig. 3; Fig. 5 is a fragmentary sectional elevation taken along line 5—5 of Fig. 3, showing a portion of the governor and governor control mechanism; Fig. 6 is an enlarged fragmentary sectional view taken along line 6—6 of Fig. 2, showing the pivotal connection of the spring stud to the governor casing; Fig. 7 is an enlarged fragmentary sectional view taken along line 7—7 of Fig. 1, showing the manner of assembly of the slidable arm and spring, and Fig. 8 is an enlarged fragmentary section as viewed along line 8—8 of Fig. 1, showing the assembly of the slidable arm to the governor and to the arm control member.

For convenience of illustration of a successful embodiment of the invention, the distinguishing control features are described in connection with a centrifugal governor of the general type illustrated by U. S. Letters Patent No. 1,954,864 to I. M. Crafts. This reference to governor structure relates, however, only to the governor elements themselves, since the control mechanism of the present invention departs in material respects from that shown by the above numbered patent.

Referring to the drawings by suitable characters of reference, numeral 10 designates, generally, a governor of the type above referred to. For completeness of assembly, it may be noted that the governor is supported on and secured to a bracket 11, which may be fastened to a portion of the engine frame 12, by means of screws or stud bolts 14. The housing 15 enclosing the governor 10, is formed, for purposes of machining and assembling, of two parts 16 and 18 formed, respectively, with journal portions 19 and 20, serving to support a governor spindle 22. The spindle at a portion intermediate its ends 23 and 24, is provided with a pin 26 which extends transversely therethrough a distance sufficient to provide a pivotal support for the centrifugally actuated governor weights 27 and 28, paired knuckles 27a and 28a formed integrally on the weights 27 and 28, respectively, being journalled on pin 26. In the assembly illustrated, rotation of the governor spindle and weights is attained by means of a pulley 29 and belt drive 30 in driven engagement with the crankshaft or other rotating part of the engine (not shown). The pulley 29 is secured in a well known manner, to the outer end 31 of a shaft 32, the shaft being properly enclosed and journalled within a governor base 34 and provided at its inner end 35 with a bevel gear 36 which is arranged to enmesh with a companion bevel gear 38 carried by the lower end 24 of the spindle 22. Although the foregoing is but illustrative of a preferred manner of driving the governor spindle from the engine, it is to be understood that any other suitable governor drive may be utilized.

The weights (Fig. 5) are shown in an inactive position, being disposed about the lower portion 24 of the spindle with their inner opposed faces 39 in abutting engagement. Each weight is provided with a pair of ears 40 apertured to receive a pin 42 therethrough. A sleeve 43 arranged concentrically of the spindle, carries a bearing assembly 44, disposed about and slidingly engaging the spindle 22, the sleeve being formed with oppositely arranged, depending portions 46 and 47 which are disposed, respectively, between the ears 40 of weights 27 and 28 in a manner to slidingly engage or roll upon the upper surfaces of pins 42. Suitably secured to each of the sleeve portions 46 and 47, is an angular plate 48 arranged to engage the under surface of pin 42. Rotation of spindle 22 is transmitted through pin 26 to the weights 27 and 28, which, under centrifugal action, are caused to swing outwardly about the pin 26. Such diverging movement of the weights raises pins 42 which bear upwardly against the depending sleeve portions 46 and 47 in a manner to effect an upward movement of the sleeve. As the centrifugal force acting on the weights is decreased, the weights will tend to move in toward each other, and since the pins 42 are in operative engagement with the angular plates 48, a downward movement of the sleeve will be effected. It is thus readily apparent that the inward and outward movement of the weights, and the resulting longitudinal movement of the sleeve on the spindle 22 may be reduced or increased by applying to the sleeve a force which will counteract the centrifugal effect of the weights.

The improvements embodying the control features for a fly ball type governor, are realized in opposing the centrifugal action of the governor weights by a suitable control spring 50, the loading of which is applied to the sleeve 43 through a rocker arm 51 (Figs. 3 and 5). The arm 51 is formed at its inner end 52 with a portion 53, which operatively engages the upper end 54 of the sleeve 43. The portion is by preference, of U shape or bifurcate construction, whereby the spindle 22 is disposed between the legs 56 of the U portion, each leg being provided with a roller 57 in rolling engagement with an inner race 54 of a ball bearing 44 carried by the upper end of the sleeve.

The outer end 58 of arm 51 is suitably pinned or otherwise secured to a control shaft 60 which is journalled in the governor housing section 16 and extends outwardly on either side therefrom, for a purpose to be presently noted. To one end 61 of the shaft 60 is operatively secured an element 62 of the control mechanism, the other related elements of which will hereinafter be fully described. To the opposite end 65 of the shaft is suitably keyed one end of an arm 66, the free end 68 of which pivotally engages a rod 69 which is in operative association with an engine fuel supply quantity regulating device, (not shown) through a speed control arm 70. Thus, a speed-regulating actuation of the governor control mechanism, will effect a turning movement of the shaft 60, and through the described control linkage, a consequent change in the engine speed, which in turn will produce a direct change in the position of the governor weights through the centrifugal forces acting thereon. Displacement of the weights in turn, results in an axial movement of the sleeve 43, which is in operative association with the shaft 60, whereby the fuel supply to the engine is so controlled as to readjust the engine speed to the predetermined desired value, and to maintain such engine speed substantially constant. From this it results that a direct operative relation exists between the governor control organization, the governor 10, and the engine speed control arm 70 and its associated fuel control mechanism, whereby actuation of the governor control effects adjustments appropriate for regulating and maintaining the engine speed.

Other elements of the governor control mechanism now to be fully described, are, by preference, located externally of the governor casing 15 and include the control element or arm 62 above briefly referred to, and which is mounted upon and secured to the shaft 60. The arm 62 is formed with a split boss portion 72 suitably disposed intermediate the ends 73 and 74 of a planar portion 76 thereof. The portion 72 is provided with a shaft receiving aperture 77 and screw-receiving apertures 78, (Fig. 8), the aperture 77 extending through the portion 76 and being of a size to receive the end 61 of shaft 60 therethrough, whereby the arm 62 may be adjustably positioned and secured to the shaft 60, as by cap screws 80 inserted through the apertures 78. The adjusted position of the arm 62 on the shaft 60, is determined by the angular position of the planar portion 76 relative to the longitudinal center line of the shaft 60, this relation being based upon the particular engine speed range through which governor control is desired. In the present preferred example, let it be assumed that a relatively wide speed range is desired, and hence the position of the arm 62 relative to the previously noted center line, is determined from the high and low speed control limits of the governor. The high speed limit of control is attained when the centrifugal force acting on the governor weights is sufficiently great to move the sleeve 43 upwardly so as to effect an abutting engagement of the legs or trunnions 56 of the arm 51 with the lower surface 81 of the housing journal portion 19, as will be readily seen from an inspection of Figs. 4 and 5. Thus the maximum high speed control limit of the governor is positively attained, and no further high speed control action of the governor on the engine fuel supply mechanism will occur after abutment of the trunnions 56 with the surface 81. The low speed limit of the control is reached when the centrifugal force on the governor weights becomes less than the gravitational force on the weights, so as to allow the weights to return to an abutting or inactive position, as they appear in Fig. 5. With the weights in this position, there can occur no further low speed control action of the governor on the engine fuel supply mechanism. It is apparent that, as the governor weights are displaced from their noted limit of low speed control, to their fartherest position of high speed control, the shaft 60 actuated in response to the displacement of the weights, will turn through an angular distance which may be readily and definitely determined. Having determined the angular extent of the arc through which shaft 60 rotates in response to the displacement of the governor weights between their described minimum and maximum control positions, it is preferred in the present example, as an assembly step, to secure the control arm 62 to the end 61 of shaft 60, so that this arm will be disposed in a horizontal plane when the shaft 60 is actuated to a position midway between the ends of its arcuate movement, this position of the shaft and arm corresponding to the displacement of the governor weights to a point midway between the described control limits. It is thus seen that, during the operation of the governor between the described control limits, the arm 62 will oscillate through an arc which extends substantially equally above and below a horizontal plane through the axis of the shaft 60. It is to be noted, however, that the above desired manner of assembly is merely a preferred practice in connection with the illustrated control elements.

The arm 62 of the control mechanism is formed to provide spaced, longitudinally extending guideways 82 and 84, these ways projecting laterally of the arm and serving as supporting and guiding portions, for a member 85 slidably mounted thereon (Figs. 1, 7 and 8). The way 82 extends laterally and upwardly of the arm, and over this way extends an angulate tongue resulting in a groove portion 86 of the member 85, the groove and portion 82 serving to effect a positive seating of the member 85 on the ways, and also to maintain the slidable member in assembly with the arm 62 against the laterally downward pull exerted by the governor control spring 50 on the member 85 to which it is connected, as will presently appear. The member 85 is provided, also, with an inturned flange 87 on its lower end, which engages the under side of the way 84, this flange serving to further secure the member 85 in assembly with the arm 62.

One end 88 of the spring is in pivotal engagement with the lower end 89 of an element 90, the upper end 92 of which is pivotally connected to the slide member 85 near its end 93 as by means of a pin 94. The assembly of the pivot pin 94 to the slide 85 is attained in a preferred manner, as by providing a transverse slot 95 in the slide, in which the pin is inserted and seated in the lower end 99 of the slot. As a result, the effective pivotal axis of the spring supporting element 90 and pin 94 is found in the substantially line contact between the pin 94 and the lower end 99 of the slot. The lower end 96 of the spring is connected to a nut 97 threadedly engaging one end of a bolt or other similar element 98, the opposite or head end 100 of the bolt or stud being suitably pivoted at 101 (Figs. 1, 2 and 6) to the bracket 11. Thus the initial tension in the spring 50 may be regulated to any predetermined value, by threading the nut along the bolt. The pivotal connection 101 is, by preference, of a translatable or shifting type, providing a self-adjusting support for the spring. As shown in Figs. 2 and 6, a plate element 135 is secured to the bracket 11 as by bolts 136, and is slotted at 137 to receive the head end portion of bolt 98. A dished washer 138 is disposed between the head 100 of bolt 98 and the plate 135 to provide a pivotal seat for the bolt head. As a means for preventing rotation of the washer, a lip 140 formed as an integral part of the washer, extends upwardly adjacent an edge 141 of the plate 135 (Fig. 6). By reason of the self-adjusting feature of pivot stud 98, its axis will be at all times in axial alignment with the axis of the spring 50 and hence perpendicular to the above described effective pivotal axis of the link pin 94. It is thus seen that the entire force of the spring is exerted substantially along the axis of the stud intersecting the effective pivotal axis of the pin 94 supporting the spring mounting element 90, this axis defining the line of spring force.

In the operation of the governor control mechanism, as the slidable member 85 is moved to the right (Fig. 1) so as to decrease the distance between the axis of the control shaft 60 and the axis of the spring supporting pin 94, the effective moment arm of the spring 50 acting on the shaft 60 will be correspondingly decreased. Increasing this distance results in increasing the effective moment arm of the spring. It will be noted that the upper spring pivot pin is constrained for adjusting movement in a path coincident with a radial line passing through the axis of shaft 60. When the member 85 is actuated to the right (Fig. 1) sufficiently to bring the effective pivotal axis of the spring pin 94 into substantial coincidence with the axis of the control shaft 60, the effective moment arm through which the spring acts upon the shaft 60 will be substantially zero, hence the control spring 50 will have practically no effect upon the governor mechanism. This condition of zero moment arm, nullifying the effect of the spring upon the governor weights, becomes absolute when the above defined line of spring force of the spring 50 passes through the axis of the control shaft 60. It will be noted as a distinct preference, to provide for translation of the point of spring anchorage 94, in a direction to the right (Fig. 1) at least to an intersection of the spring axis with the axis of rock shaft 60. By this is intended, as a preference, that the spring anchorage shall be movable at least a certain distance beyond the axis of shaft 60, in which position it will appear that the spring 50 assists, rather than opposes the centrifugal action of the governor weights, thus providing, when desired, a quick-operating mechanism for stopping the associated engine. It is to be noted also, that when the spring moment arm is reduced to a zero value, the force exerted by the spring on the governor weights becomes zero, but the tension in the spring itself is maintained at some finite value. This condition is greatly to be desired, for when the moment arm of the spring is increased from a zero length to a predetermined desired length, the initial tension in the spring will act through the moment arm to effect an immediate moment force on the governor weights. Thus it is seen that the spring is tensional at all times, whereby the action of the control mechanism on the governor weights is practically instantaneous.

Discussing now a preferred arrangement for shifting the slidable member 85 along the arm 62, this is preferably accomplished by a rack and pinion mechanism now to be described. One end 102 of a rack bar 104 is pivotally connected, as by a pin 105 (Figs. 1 and 8) to the slidable member 85, the pin connection being made on the end of the member adjacent the control shaft 60 so that its position relative to the shaft will least affect the angular movement of the arm 62 during normal operation of the governor. As hereinabove noted, the range of arcuate movement of arm 62 extends substantially equally above and below a horizontal plane passing through the axis of the shaft 60, and in the present preferred example, the total angular extent of oscillatory movement of the arm 62 is about fifteen degrees. Thus as will be readily understood, the shorter the distance between the rack assembly pin 105 and the shaft 60, the less is the angular displacement of the rack bar 104 occurring during movement of the arm 62.

The rack 104 is suitably supported on a roller 106 provided with a groove 108, which is of a width sufficient to receive the rack therein. The rack is actuated in a reciprocatory manner by a pinion 109 which is suitably keyed to one end 110 of a shaft 112 (Fig. 3). The pinion is, by preference, of such size as to effect a relatively small reciprocatory displacement of the rack bar for each revolution of the pinion, so that a coarse actuation of the pinion may effect a relatively fine adjustment of the position of the member 85 along the arm 62. The pinion shaft 112 is carried by suitably spaced bearings 113 and 114 formed in or carried by a bracket 116 which is conveniently secured to the governor casing 15 by means of screws 117. The end 118 of the shaft is provided with a grooved wheel or pulley 120 which is secured thereto by a pin 121. The wheel may be actuated directly by hand, or through a cord 122 seating in the groove, and extending to and operated from a remote control station.

As a means tending to maintain the shaft 112, pinion 109 and rack bar 104 in adjusted positions, as determined by the actuation of the pulley 120, a spring 124 is disposed about the shaft 112 intermediate the bearings 113 and 114, and is maintained under compression between a retaining ring 125 and shaft pin 126 at one of its ends, and a collar 128 located in engagement with the bearing 114. The spring serves to effect a frictional pressure between the face 129 of the hub of wheel 120 and the outer face 130 of bearing 114, and also between the collar 128 and the inner face 132 of bearing 114, so as to present a resistance to adjusting rotation of the shaft 112 and to the displacement of the rack 104 and the slidable member 85. But for this provision, any casual or unintended movement of the control mechanism might easily disturb the speed control setting. Moreover, the described frictional resistance may be adjusted by regulating the compression of the spring in any suitable manner, as by selecting a different seat 127 for the pin 126, so that the control movement of wheel 120 may effect the desired result without requiring the application of excessive force.

It will have appeared that the member 85 may be readily and easily adjusted to effect a desired change in the moment arm of the spring 50 acting about the axis of the shaft 60, and a consequent change in the force applied thereto, to counteract the centrifugal force of the rotating weights 27 and 28, whereby the engine speed may be quickly and efficiently varied and maintained at any desired value, within the limits of a wide range of engine speeds. It is to be noted that although the above described mechanism for moving the member 85 along the arm 62 is presently preferred, any other mechanism capable of moving the member in the described manner, and attaining a nicety of adjustment thereof, may be utilized.

The foregoing description and drawings relate to a preferred embodiment of the present invention, but it is to be understood that various modifications and alterations may be effected therein without departing from the spirit and full intent of the invention, as defined by the appended claims.

I claim:

1. A governor and control assembly therefor, including a governor spindle, fly weights carried by the spindle, a control shaft operatively connected with said fly weights, adapted to rock in response to centrifugal movement of the fly weights, an elongate lever arm secured at a point located between its opposite ends to one extremity of the shaft, the longitudinal axis of said lever arm extending diametrally with respect to the shaft, a slide carried by and shiftable along said lever arm between extreme positions located at relatively opposite sides of the shaft, a tension spring for opposing centrifugal movement of the fly weights having one end anchored at a point laterally remote from said lever arm, means pivotally connecting the opposite end of said spring to said slide at a point located on the longitudinal axis of the lever arm, said spring being adapted thereby to act at variable points along the lever arm, including a point coincident with the axis of said shaft; and means for shifting the slide along the lever arm.

2. A governor and control assembly therefor, including a governor spindle, fly weights carried by the spindle, a control shaft operatively connected with said fly weights, adapted to rock in response to centrifugal movement of the fly weights, an elongate lever arm secured at a point located between its opposite ends to one extremity of the shaft, the longitudinal axis of said lever arm extending diametrally with respect to the shaft, a slide carried by and shiftable along said lever arm between extreme positions located at relatively opposite sides of the shaft, a tension spring for opposing centrifugal movement of the fly weight having one end anchored at a point laterally remote from said lever arm, means pivotally connecting the opposite end of said spring to said slide at a point located on the longitudinal axis of the lever arm, said spring being adapted thereby to act at variable points along the lever arm, including a point coincident with the axis of said shaft; and means for shifting the slide along the lever arm, including a rack and pinion drive and frictional means operatively associated with the pinion for preventing unintended rotation thereof.

FRANKLIN G. HOBART.